(No Model.)
R. MANNESMANN.
MEANS FOR CONVEYING WATER OVER HILLS OR MOUNTAINS.
No. 555,014. Patented Feb. 18, 1896.
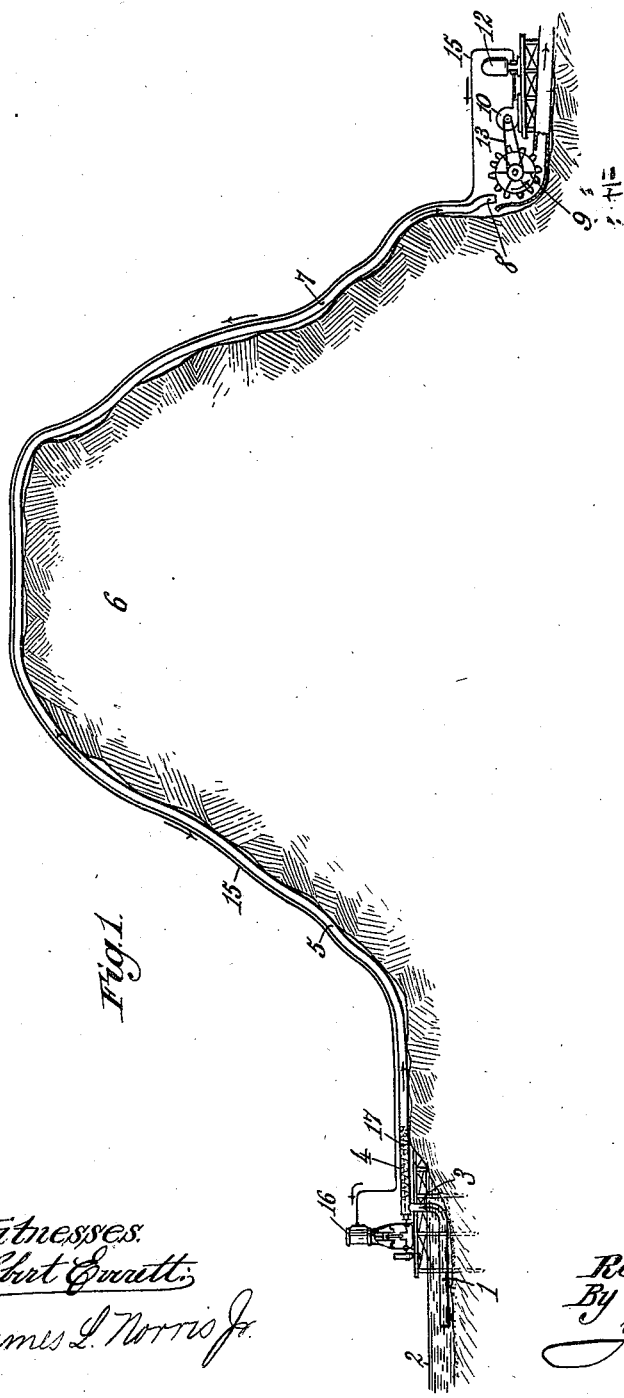
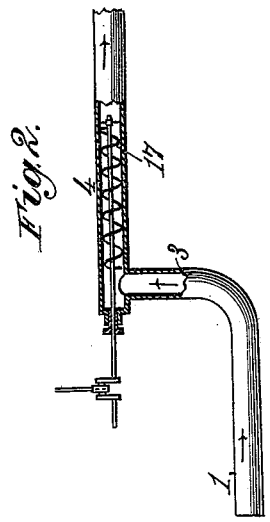
Witnesses:
Robert Everett
James L. Norris Jr.
Inventor:
Reinhard Mannesmann.
By James L. Norris
Atty.

UNITED STATES PATENT OFFICE.

REINHARD MANNESMANN, OF NEW YORK, N. Y., ASSIGNOR TO THE MANNESMANN TUBE COMPANY, OF JERSEY CITY, NEW JERSEY.

MEANS FOR CONVEYING WATER OVER HILLS OR MOUNTAINS.

SPECIFICATION forming part of Letters Patent No. 555,014, dated February 18, 1896.

Application filed January 22, 1895. Serial No. 535,841. (No model.)

*To all whom it may concern:*

Be it known that I, REINHARD MANNESMANN, a citizen of Germany, residing at New York, in the county of New York and State of New York, have invented new and useful Improvements in Means for Conveying Water Over Hills or Mountains, of which the following is a specification.

This invention relates to means for raising water over hills, mountains, or other elevations, and has for its chief object to render it possible to utilize the descending column of liquid or water flowing through a liquid or water conduit or pipe-line for the purpose of compressing air, which is used to operate a liquid or water forcing device or mechanism acting to drive or force liquid or water through said conduit or pipe from a starting-point to some distant point, whereby liquid or water may be automatically raised to a greater height than is possible with suction-pumps, in order to supply cities, towns, villages, factories, and other places with liquid or water for any desired purpose from lakes and other bodies of water which lie in such locations that the liquid or water cannot by ordinary contrivances be practicably utilized at distant points if it is essential to carry the liquid or water over hills or mountains.

To accomplish this object my invention involves the features, the principles of operation, the order of procedure, and the mechanical contrivances or devices hereinafter described and pointed out in the claims, reference being made to the accompanying drawings, in which—

Figure 1 is a diagrammatical view sufficient to enable my invention to be understood by those skilled in the art, and Fig. 2 is a detail sectional view of the end portion of the water-conduit or pipe-line which connects with the lake or other body of water or liquid.

In order to enable those skilled in the art to make and use my invention I will now describe the apparatus illustrated in the drawings, which is typical of many apparatuses adapted to be employed for carrying my invention into effect.

The numeral 1 indicates a water-inlet connected with a lake or other body of water or liquid. (Indicated by the numeral 2.) This water-inlet, as shown in the drawings, is bent vertically, as at 3, horizontally, as at 4, and connects or communicates with a liquid or water conduit or pipe-line 5, designed to be carried over a hill, mountain, or other elevation (indicated by the numeral 6) and to descend, as at 7, to a point considerably below the level of the water in the lake or other source of water-supply. The lower end, 8, of the descending portion 7 of the conduit or pipe-line is so arranged as to deliver water to a suitable motor 9, which, as here illustrated, is in the form of a Pelton water-wheel, arranged to be rotated in a vertical plane by the power of the water issuing from the lower or delivery end, 8, of the conduit or pipe-line. The motor or water-wheel is designed to operate an air-compressing apparatus. (Indicated by the numeral 10.) As here indicated, the air-compressing apparatus is in the form of a rotary pump, having an air-reservoir 12. The pump is operated by a belt connection 13 with the shaft of the motor or water-wheel 9. The purpose of the motor or water-wheel is to operate the air-compressing apparatus, and so far as this is concerned the construction of the motor or water-wheel is immaterial, and therefore I do not wish to be understood as confining myself to the particular motor or water-wheel above referred to.

The air-reservoir 12 of the air-compressing apparatus connects by an air-pipe line 15 with an air-pump 16 or other suitable motor adapted to be operated by compressed air, and located in juxtaposition to the inlet 1 of the water-conduit or pipe-line. The air-pump or other motor 16 is suitably connected with a worm 17 or other suitable water-forcing device located within the horizontal portion 4 of the water-conduit or pipe-line, all in such manner that when the worm or other water-forcing device 17 is rotated, water from the lake or other source of supply is drawn into the water-inlet 1 and forced through the water-conduit or pipe-line 5 to the delivery end thereof. The descending water or liquid issuing from the delivery end of the conduit or pipe-line acts upon the motor or water-wheel 9 for the purpose of rotating the same, whereby the air-compressing apparatus is operated and air is compressed in the reservoir 12, from whence the compressed air is conducted by the air-pipe line 15 to the air-pump or other motor 16. In this manner I utilize the descending column of liquid or water flowing through the liquid or water conduit or pipe-line for compressing atmospheric air, which is carried back to the starting-point and operates a liquid or water forcing device or mechanism, and this device or mechanism drives or forces liquid or water through said conduit or pipe-line from the lake or starting-point to the distant point or delivery end of the water-conduit or pipe-line.

By the means described liquid or water may be automatically raised to a greater height than with suction-pumps, and it is possible to convey water over hills, mountains, and other elevations for the purpose of supplying cities, towns, villages, factories, and other places with water for any desired purpose from lakes and other bodies of water or liquid which lie so remotely or in such peculiar situations that the water cannot by ordinary means be practicably utilized at distant points.

In practical operation the column of liquid or water starts the motor or motor-wheel into action, and the operation of the system hereinbefore described is automatic and continuous in that the liquid or water flowing through the descending portion of the water-conduit or pipe-line continuously actuates the motor or water wheel, and the compressed air is conducted to the starting-point, for the purpose of operating the air-pump or other motor 16, which rotates the screw or worm or other water-forcing device.

The water passing to the outlet-conduit 18 can be used for supplying cities, towns, villages, factories, and other places with water for power or any other purpose for which it is desired to use water or other liquid.

The essential feature of the invention consists in causing the descending liquid or water to compress air which is conducted to the starting-point and caused to operate a motor which drives a water-forcing device or mechanism for forcing liquid or water through the water-conduit or pipe-line.

I may substitute an open ditch or other water-way for any horizontal parts of the water-conduit or pipe-line. This open ditch or water-way will in practice extend a certain distance horizontally, and then deliver the water into a pipe which may conduct it to another approximately horizontal open ditch or water-way.

I do not wish to be understood as confining myself to any particular arrangement of parts for carrying my invention into effect, as the apparatus or mechanical contrivances can be modified without altering the spirit of the invention.

The pipe-line for carrying the air to the air-pump or motor which operates the water-forcing device or mechanism is reduced in diameter and the air travels at a high speed for the purpose of reducing the cost of the air-pipe line.

In initiating the working of the system, the worm, screw, or other forcing device 17 may be rotated in any suitable manner until liquid or water flows from the delivery end 8 of the conduit or pipe-line and rotates the Pelton water-wheel or other motor, after which the action of the system will be automatic.

I do not herein broadly claim the method of conveying liquid from a source or supply to a distant point or station by causing a column of liquid descending through the conduit to compress atmospheric air, conducting a part or all of such air to the starting-point of the conduit, and causing the compressed air to move the liquid therethrough, nor do I herein claim the combination of a liquid or water-conduit following an ascending and descending course, a device communicating with a source or supply and connected with the said conduit, means for compressing air by the action of the descending column of liquid or water, and an air-pipe line for conveying the compressed air to the device for continuing the movement of the liquid or water through the ascending part of said conduit, as such method and combination constitute the subject-matter of my application for Letters Patent filed January 19, 1895, Serial No. 535,537.

Having thus described my invention, what I claim is—

1. The combination of a conduit following the ascending and descending portion of a hill or mountain, an inlet communicating with the said conduit and receiving liquid or water from a source or supply, a liquid or water forcing device located in juxtaposition to the said source or supply and operating to force the liquid or water through the inlet into and through the ascending part of the conduit, a motor for actuating said liquid or water forcing device, means for compressing air by the power or pressure of the liquid or water flowing through the descending part of the conduit, and an air-pipe line running from the air-compressing means and conducting compressed air back to said motor for driving the latter and thereby operating the liquid or water forcing device which is located in juxtaposition to the source or supply, substantially as described.

2. The combination of a liquid or water conduit, having its discharge end located below its receiving end, an inlet communicating with the receiving-end portion of the conduit and receiving liquid or water from a source or supply, a liquid or water forcing device located in juxtaposition to the said source or supply and operating to force the liquid or water through the inlet into and through the conduit, a motor connected with the liquid or water forcing device for operating the latter, a compressed-air chamber or reservoir in which air is compressed through the medium of the power or pressure of the liquid or water forced through the conduit, and an air-pipe line running from the compressed-air chamber or reservoir and conducting compressed air back to the motor which is located in juxtaposition to the source or supply, for operating said motor and thereby actuating the liquid or water forcing device, substantially as described.

In testimony whereof I have hereunto set my hand in the presence of two subscribing witnesses.

REINHARD MANNESMANN.

Witnesses:
ALBERT H. NORRIS,
G. W. REA.